(12) United States Patent
Khaleeluddin et al.

(10) Patent No.: US 11,556,477 B2
(45) Date of Patent: Jan. 17, 2023

(54) SYSTEM AND METHOD FOR CONFIGURABLE CACHE IP WITH FLUSHABLE ADDRESS RANGE

(71) Applicant: Arteris, Inc., Campbell, CA (US)

(72) Inventors: Mohammed Khaleeluddin, Santa Clara, CA (US); Jean-Philipe Loison, San Jose, CA (US)

(73) Assignee: ARTERIS, INC., Campbell, CA (US)

( * ) Notice: Subject to any disclaimer, the term of this patent is extended or adjusted under 35 U.S.C. 154(b) by 285 days.

(21) Appl. No.: 16/443,595

(22) Filed: Jun. 17, 2019

(65) Prior Publication Data

US 2019/0384714 A1 Dec. 19, 2019

Related U.S. Application Data

(60) Provisional application No. 62/685,894, filed on Jun. 15, 2018.

(51) Int. Cl.
*G06F 12/0891* (2016.01)
*G06F 9/30* (2018.01)
(Continued)

(52) U.S. Cl.
CPC ...... *G06F 12/0891* (2013.01); *G06F 9/30101* (2013.01); *G06F 12/0804* (2013.01); *G06F 12/12* (2013.01)

(58) Field of Classification Search
CPC ............... G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902;
(Continued)

(56) References Cited

U.S. PATENT DOCUMENTS 5,524,225 A * 6/1996 Kranich .............. G06F 12/0804
711/143
5,586,293 A * 12/1996 Baron ................. G06F 12/0802
710/14
(Continued)

OTHER PUBLICATIONS

T. Kluter, P. Brisk, E. Charbon and P. Ienne, "Way Stealing: A Unified Data Cache and Architecturally Visible Storage for Instruction Set Extensions," in IEEE Transactions on Very Large Scale Integration (VLSI) Systems, vol. 22, No. 1, pp. 62-75, Jan. 2014, doi: 10.1109/TVLSI.2012.2236689. (Year: 2014).*
(Continued)

*Primary Examiner* — Daniel C. Chappell
(74) *Attorney, Agent, or Firm* — Dana Legal Services; Jubin Dana

(57) ABSTRACT

A system and method are disclosed for a cache IP that includes registers that are programmed through a service port. Service registers are selected from the registers to define an address range so that all cache lines within the address range can be flushed automatically using a control signal sent to a control register.

9 Claims, 1 Drawing Sheet

(51) Int. Cl.
 *G06F 12/12* (2016.01)
 *G06F 12/0804* (2016.01)

(58) Field of Classification Search
 CPC .... G06F 2212/00–7211; G06F 2213/00–4004;
  G06F 2216/00–17; G06F 2221/00–2153;
  G11B 20/00–24; G11B 33/00–1493;
  G11C 7/00–24; G11C 11/00–5692; G11C
  13/00–06; G11C 14/00–009; G11C
  15/00–06; G11C 16/00–3495; G11C
  17/00–18; G11C 2207/00–229; G11C
  2216/00–30; H01L 27/00–3297; H04L
  9/00–38; H04L 12/00–66; H04L
  41/00–5096; H04L 49/00–9094; H04L
  61/00–6095; H04L 67/00–42
 See application file for complete search history.

(56) References Cited

U.S. PATENT DOCUMENTS

| | | | | |
|---|---|---|---|---|
| 5,790,137 | A * | 8/1998 | Derby | G06F 12/0802 |
| | | | | 345/545 |
| 5,895,487 | A * | 4/1999 | Boyd | G06F 12/0897 |
| | | | | 711/122 |
| 6,182,203 | B1 * | 1/2001 | Simar, Jr. | G06F 9/30036 |
| | | | | 712/13 |
| 6,378,048 | B1 * | 4/2002 | Prudvi | G06F 12/0811 |
| | | | | 711/122 |
| 6,535,958 | B1 * | 3/2003 | Fuoco | G06F 12/0802 |
| | | | | 711/122 |
| 6,546,462 | B1 * | 4/2003 | Palanca | G06F 12/0804 |
| | | | | 711/146 |
| 6,574,710 | B1 * | 6/2003 | Gaither | G06F 12/0811 |
| | | | | 711/122 |
| 6,629,187 | B1 * | 9/2003 | Krueger | G06F 9/3885 |
| | | | | 711/3 |
| 6,874,065 | B1 * | 3/2005 | Pong | G06F 12/0817 |
| | | | | 711/E12.027 |
| 9,424,198 | B2 * | 8/2016 | Raikin | G06F 12/0893 |
| 10,204,047 | B2 * | 2/2019 | Diamand | G06F 12/0811 |
| 10,394,747 | B1 * | 8/2019 | Paneah | G06F 13/404 |
| 10,515,045 | B1 * | 12/2019 | Mattina | G06F 13/4022 |
| 10,528,519 | B2 * | 1/2020 | Rosenbluth | G06F 15/80 |
| 10,565,111 | B2 * | 2/2020 | Ezoe | G06F 12/0897 |
| 10,789,175 | B2 * | 9/2020 | Tal | G06F 12/123 |
| 2002/0152359 | A1 * | 10/2002 | Chaudhry | G06F 12/0808 |
| | | | | 711/141 |
| 2006/0064547 | A1 * | 3/2006 | Kottapalli | G06F 12/123 |
| | | | | 711/133 |
| 2007/0130237 | A1 * | 6/2007 | Altman | G06F 12/0804 |
| 2009/0080280 | A1 * | 3/2009 | Boucard | G11C 7/22 |
| | | | | 365/230.03 |
| 2013/0166846 | A1 * | 6/2013 | Gaur | G06F 12/0897 |
| | | | | 711/122 |
| 2014/0108736 | A1 * | 4/2014 | Kuskin | G06F 12/0891 |
| | | | | 711/135 |
| 2014/0304475 | A1 * | 10/2014 | Ramanujan | G06F 11/07 |
| | | | | 711/135 |
| 2017/0024329 | A1 * | 1/2017 | Ishii | G06F 12/0811 |
| 2017/0031830 | A1 * | 2/2017 | BK | G06F 3/067 |
| 2017/0220592 | A1 * | 8/2017 | Foltz | G06F 3/067 |
| 2017/0255563 | A1 * | 9/2017 | Kamruzzaman | G06F 12/126 |
| 2018/0052778 | A1 * | 2/2018 | Kalamatianos | G06F 12/0817 |
| 2019/0073305 | A1 * | 3/2019 | Hijaz | G06F 12/128 |
| 2021/0255942 | A1 * | 8/2021 | Jung | G11C 13/004 |

OTHER PUBLICATIONS

G. Kalokerinos et al., "FPGA implementation of a configurable cache/scratchpad memory with virtualized user-level RDMA capability," 2009 International Symposium on Systems, Architectures, Modeling, and Simulation, 2009, pp. 149-156, doi: 10.1109/ICSAMOS.2009.5289226. (Year: 2009).*

* cited by examiner

SYSTEM AND METHOD FOR CONFIGURABLE CACHE IP WITH FLUSHABLE ADDRESS RANGE

CROSS REFERENCE TO RELATED APPLICATION

This application claims the benefit of U.S. Provisional Application No. 62/685,894 titled SYSTEM AND METHOD FOR CONFIGURABLE STAND-ALONE NON-COHERENT CACHE IP and filed on Jun. 15, 2018, the entire disclosure of which is incorporated herein by reference.

FIELD OF THE INVENTION

The disclosed invention is in the field of computer systems and, more specifically, related to systems including cache IPs with a mechanism to flush an address range.

BACKGROUND

A cache is a common feature for improving the performance and reducing the power consumption of an on-chip processing system. The cache buffers copies of data close to the processing elements that manipulate the data, e.g. CPUs, GPUs, etc. Caches include relatively small memory arrays that have a short access time and increase system performance by reducing average memory latency. When the processing element writes data to memory, the cache can intercept the writes and only update the cache content. The memory can be updated later, for instance if the modified cache line is evicted, or explicitly through a cache maintenance operation called a flush. Flushing a line of the cache consist in copying the line in memory if the line is dirty, then marking the line as invalid. Typically, caches will store data structures which will be stored in memory at contiguous addresses, between a start address and an end address. After the processing element has finished working with a data structure, if it is required that the memory is updated with the latest values of the said data structure, all cache lines containing part of that data structure need to be flushed. This can be done line by line through a software running on a processing element, but this is taking time from the processing element. Therefore, what is needed is a system and method that allows selection and identification of an address range in a cache IP that can be controlled using a command sent to control register, so that the cache itself automatically flushes all cache lines containing data that belongs to the address range.

SUMMARY

A system and method are disclosed for a cache IP with cache lines. The cache IP can buffer memory data and services read and write transactions to addresses buffered in the cache IP without accessing main memory. An address range is identified using a set of cache service registers. The set of cache service registers also contain a control register. The control register receives a control or trigger command. The cache IP does not attempt to maintain automatically coherency with any other caches that may be present in the system, either at the same level or upstream between the cache IP and the requesting processors. Any coherence necessary between the cache IP and other caching agents in the system is maintained by system software. The system software can use the cache maintenance registers to define address ranges and trigger flush operation for all cache lines within the address range to do so. In accordance with various embodiment of the invention, the cache IP improves system performance while saving power, by reducing average memory access latency and by reducing the number of off chip memory accesses.

BRIEF DESCRIPTION OF THE DRAWINGS

The foregoing summary as well as the following detailed description is better understood when read in conjunction with the appended drawings. For the purpose of illustrating the invention, there is shown in the drawings embodiments in accordance with various aspects of the invention. However, the invention is not limited to the specific embodiments and methods disclosed. In the drawing figures.

DETAILED DESCRIPTION

All statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. It is noted that the specific examples provided are for illustration purpose and not as a limitation of the invention. It is noted that, as used herein, the singular forms "a," "an" and "the" include plural referents unless the context clearly dictates otherwise. Reference throughout this specification to "one aspect," "another aspect," "one embodiment," "an embodiment," "certain embodiment," or similar language means that a particular aspect, feature, structure, or characteristic described in connection with the embodiment is included in at least one embodiment of the invention. Thus, appearances of the phrases "in one aspect," "in one embodiment," "in at least one embodiment," "in an embodiment," "in some embodiments," and similar language throughout this specification may, but do not necessarily, all refer to the same embodiment or similar embodiments.

The described features, structures, or characteristics of the invention may be combined in any suitable manner in accordance with the aspects and one or more embodiments of the invention. In the following description, numerous specific details are recited to provide an understanding of various embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring the aspects of the invention.

In accordance with the aspects of the invention, data that has been accessed previously are likely to be accessed again. Allocating frequently-accessed data in a cache decreases the time that a processing element may spend waiting for that data. In this behavior, the workload exhibits temporal locality. Data is allocated within caches in quantities known as cache lines, which are larger than the typical size of a memory access performed by a processing element. As many workloads access data from adjacent addresses, the memory latency for subsequent accesses to nearby addresses is reduced.

Figure 1:
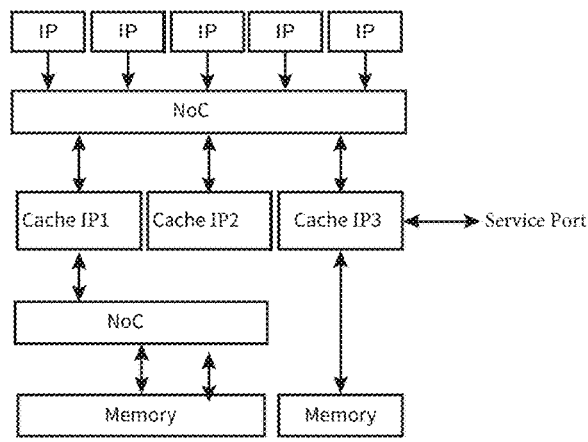
FIG. 1 shows a system level implementation including multiple cache IPs in accordance with the various embodiments of the invention.

Referring now to FIG. 1, a system is shown with multiple cache IPs, In accordance with various aspects of the invention. In accordance with one embodiment, each cache IP implements 64-byte cache lines and supports three cache states: Invalid, Clean & Dirty. The number of cache lines selected is for illustration purposes; any number of cache lines can be selected and implement for the cache IP. In accordance with one embodiment, read states from downstream memory that are allocated in the cache without any modification by the cache IP are allocated in a Clean state. All writes that are allocated in the cache, are allocated in a Dirty state. If a write results in a hit and the cache is updated, then the state of the cache line is updated to Dirty. The cache line in Dirty state is now up-to-date, but not the corresponding location in memory.

Figure 2:
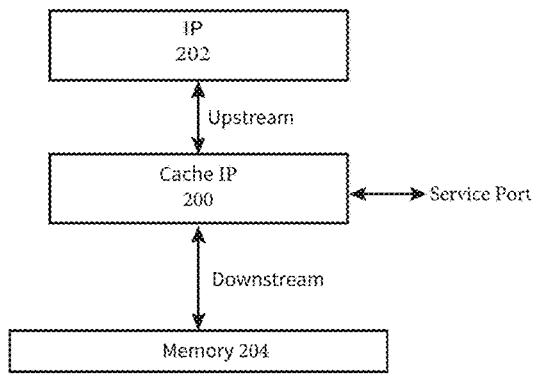
FIG. 2 shows cache IP with interfaces both upstream (from the processing units) and downstream (to the system memory) in accordance with the various embodiments of the invention.

Referring now to FIG. 2, a cache IP 200 is shown in accordance with various aspects of the invention. The cache IP 200 is in communication with IP 202 and memory 204. The cache IP supports an extensive set of features and includes configurability that allows the cache IP to be optimized for a very wide range of systems and requirements. The cache IP features may include:

Upstream and downstream interfaces;
Service Port interface for configuration;
Configurable cache;
Configurable associativity of ways;
Configurable number of tag and data banks;
Configurable type of replacement policy;
Configurable scratchpad memory; and
Coherency management via hardware assisted cache flush.

In accordance with various aspects of the invention, Reads that do not hit in the cache result in a miss. To complete the read request, a transaction is sent out on the downstream port. These reads are tracked by read transaction table (RTT). The configuration of the RTT determines the effective memory read bandwidth of the cache IP, based on the latency to the corresponding memory downstream. To first order, the number of RTT entries divided by the average round-trip read latency to the downstream memory determines the effective memory read request bandwidth. The maximum memory read bandwidth is equal to the memory read request bandwidth multiplied by the cache line size. The width of the cache IP read datapaths multiplied by the operating clock frequency also places an upper bound on the memory read bandwidth.

In accordance with various aspects of the invention, partial writes that do not hit the cache, evictions from the cache, and writes that are not accompanied by an allocate hit and miss the cache are sent out on the downstream port. These writes are tracked by the write transaction table (WTT). The configuration of the WTT determines the effective memory write bandwidth that the cache IP can utilize. To first order, the number of WTT entries divided by the average round-trip write latency to the downstream memory determines the effective memory write request bandwidth. The maximum memory write bandwidth is equal to the memory write request bandwidth multiplied by the cache line size. The width of the cache IP write datapaths multiplied by the operating clock frequency also places an upper bound on the memory write bandwidth.

In accordance with various aspects of the invention, allocating a new cache line may cause a valid cache line to be replaced. The cache line to be replaced is selected based on a configurable line replacement policy. First, the cache IP will search for an invalid entry in the set to which the cache line maps. If an invalid entry exists, one such entry is allocated for the new cache line. If an invalid entry does not exist, the cache IP selects a cache line for replacement using either a Random policy or a "Not-Recently Used" policy (NRU). In accordance with various aspects of the invention, the Random policy uses a pseudo-random pointer to choose a valid cache line for replacement. In accordance with various aspects of the invention, the NRU policy tracks cache lines that have been recently used (i.e. recently accessed) and selects a valid cache line for replacement from the set of cache lines that have not been recently used based on the pseudo-random pointer. The recently used status is reset for all lines in a set once all lines in a set are deemed recently used. In accordance with various aspects of the invention, the state used to implement the replacement policy is stored in the tag array. The cache IP may be configured with a separate two-port memory to store replacement policy state. If the cache IP is configured in this way, higher cache bandwidth is attainable as replacement policy state updates do not interfere with cache tag accesses.

The capacity of the cache IP is determined by specifying the number of sets and the degree of associativity (i.e. number of ways). The product of these two parameters determines the number of cache lines that are buffered in the cache IP. The number of sets must equal a power-of-two integer.

Figure 3:
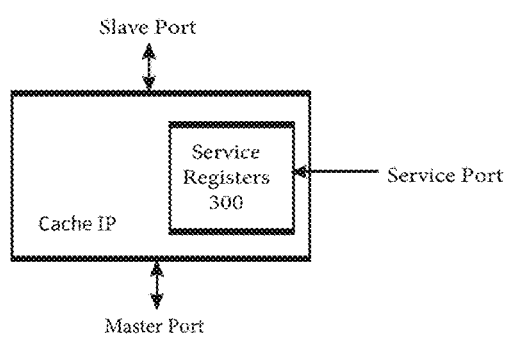
FIG. 3 shows a cache IP with registers accessible through a service port in accordance with the various embodiment of the invention.

In accordance with an embodiment of the invention, maintenance operations are used to initialize the caching structures and manage them using cache maintenance operations. These operations are performed using registers that can be accessed through a service port, which gives access to service registers 300 as shown in FIG. 3. Examples of maintenance operations include:

Initialize All Entries—This operation invalidates all entries in the cache and resets the error protection bits in the entries.

Flush All Entries—This operation evicts all dirty line and invalidates all lines in the cache and leaves all entries in the invalid state.

Flush Entry at Set and Way—This operation evicts a dirty line and invalidates all lines at the specified physical set and way in the cache and leaves the entry in the invalid state.

Flush Entry at Address—This operation evicts a dirty line and invalidates all lines matching the specified address, if any, in the cache and leaves the entry in the invalid state.

Flush Address Range—This operation evicts all dirty lines and invalidates all lines in the cache with addresses that match the specified address range; that is, the address of the cache line is greater or equal that the specified start address, and less than the end address. In accordance with some embodiments of the invention, the cache IP includes an internal mechanism that can be accessed and programmed through a service port, which gives access to service registers 300 as shown in FIG. 3. Some of these registers are defining an "address range," which is a set of contiguous addresses between a start address and an end address. In accordance with some aspects of the invention, another register can be used to trigger a "flush" operation for every cache line (defining a data structure) whose address is in the defined "address range". In accordance with an aspect of the invention, the "flush" operation includes evicting automatically Dirty cache lines from the cache IP and invalidating all cache lines whose address is in the address range. The evicted cache lines are written back to memory if their state is Dirty. In this way, the system can utilize this mechanism to ensure a particular data structure in memory, which exist at an address range, is no longer in the cache and the main memory contains the latest copy of the data. In accordance an embodiment of the invention, the registers that can be programmed to define the address range, which are triggered to flush, is implementation dependent. For instance, the user can allocate 3 registers, ADDR_START, ADDR_END, and FLUSH_CONTROL, each accessible at a different address through the service port.

Flush Set Way Range—This operation evicts all dirty lines and invalidates all lines within the specified physical set and way range in the cache.

Figure 4:
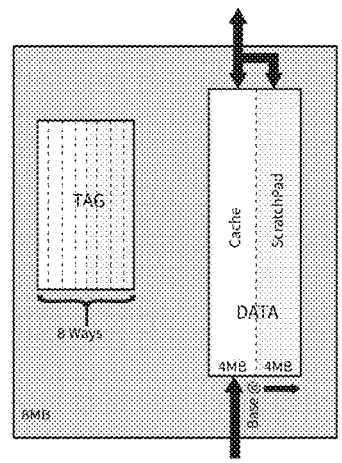
FIG. 4 shows a cache IP with a scratchpad in accordance with the various embodiments of the invention.

Referring now to FIG. 4, cache IP can be configured at initialization to partition part of the cache as a scratchpad on a per way basis in accordance with various aspects of the invention. The cache IP, in accordance with one embodiment of the invention, includes an 8 MB cache with 8 ways that has 4 of its ways configured as scratchpad, i.e. 4 MB as scratchpad and 4 MB as regular cache. It will be apparent to one skilled in the art, that the scope of the invention, as captured in the various aspects and embodiments, is not limited by the size of the cache or cache lines. In accordance with various aspects of the invention, when a way is configured as scratchpad, all the sets associated with that way will be configured as scratchpad. In accordance with various aspects of the invention, only contiguous ways starting from Way 0 can be configured as scratchpad. The scratchpad can be thought of as a standalone, low latency memory that is separate from the cache. The scratchpad can be direct mapped to a configurable address range. Accesses to this address range will be directed only to the scratchpad and will not be seen by the caching partition of the cache IP or the downstream memory.

In accordance with various aspects of the invention, system software controls the cache IP. Before processing any transactions, the cache IP is transitioned into the Operational state, which is achieved once the following requirements have been met:

The cache IP supply voltage has been made stable at an operational level;

A stable clock signal is provided at the input of the cache IP;

The cache IP input clock frequency is less than or equal to the maxi-mum frequency allowed for the given operational voltage level; and The cache IP Reset signal has been asserted and has been de-asserted after the required minimum number of cycles (for example, 16 cycles of cache clock).

Once the cache IP is in Operational state, it needs to be transitioned to the Online state so that the cache can be utilized. To transition the cache IP into the Online state, software must perform the following steps:

1. Perform an "Initialize all entries" maintenance operation for the tag arrays by writing the appropriate values;
2. Poll the cache IP maintenance operation active bit until the bit equals zero;
3. Perform an "Initialize all entries" maintenance operation for the data arrays by writing the appropriate values;
4. Poll the cache IP maintenance operation active bit until the bit equals zero;
5. If the cache IP was built with scratchpad support, then as desired enable the scratchpad;
6. Enable the cache IP lookups by writing a one to the cache lookup enable bit; and
7. Enable cache IP fills by writing a one to the cache IP fill enable bit.

Accordingly, the preceding merely illustrates the various aspects and principles as incorporated in various embodiments of the invention. It will be appreciated that those of ordinary skill in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

Unless defined otherwise, all technical and scientific terms used herein have the same meaning as commonly understood by one of ordinary skill in the art to which this invention belongs. The verb couple, its gerundial forms, and other variants, should be understood to refer to either direct connections or operative manners of interaction between elements of the invention through one or more intermediating elements, whether or not any such intermediating element is recited. Any methods and materials similar or equivalent to those described herein can also be used in the practice of the invention. Representative illustrative methods and materials are also described.

All publications and patents cited in this specification are herein incorporated by reference as if each individual publication or patent were specifically and individually indicated to be incorporated by reference and are incorporated herein by reference to disclose and describe the methods and/or system in connection with which the publications are cited. The citation of any publication is for its disclosure prior to the filing date and should not be construed as an admission that the invention is not entitled to antedate such publication by virtue of prior invention. Further, the dates of publication provided may be different from the actual publication dates which may need to be independently confirmed.

Additionally, it is intended that such equivalents include both currently known equivalents and equivalents developed in the future, i.e., any elements developed that perform the same function, regardless of structure. The scope of the invention, therefore, is not intended to be limited to the exemplary embodiments shown and described herein.

In accordance with the teaching of the invention a computer and a computing device are articles of manufacture. Other examples of an article of manufacture include: an electronic component residing on a mother board, a server, a mainframe computer, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods.

The article of manufacture (e.g., computer or computing device) includes a non-transitory computer readable medium or storage that may include a series of instructions, such as computer readable program steps or code encoded therein. In certain aspects of the invention, the non-transitory computer readable medium includes one or more data repositories. Thus, in certain embodiments that are in accordance with any aspect of the invention, computer readable program code (or code) is encoded in a non-transitory computer readable medium of the computing device. The processor or a module, in turn, executes the computer readable program code to create or amend an existing computer-aided design using a tool. The term "module" as used herein may refer to one or more circuits, components, registers, processors, software subroutines, or any combination thereof. In other aspects of the embodiments, the creation or amendment of the computer-aided design is implemented as a web-based software application in which portions of the data related to the computer-aided design or the tool or the computer readable program code are received or transmitted to a computing device of a host.

An article of manufacture or system, in accordance with various aspects of the invention, is implemented in a variety of ways: with one or more distinct processors or microprocessors, volatile and/or non-volatile memory and peripherals or peripheral controllers; with an integrated microcontroller, which has a processor, local volatile and non-volatile memory, peripherals and input/output pins; discrete logic which implements a fixed version of the article of manufacture or system; and programmable logic which implements a version of the article of manufacture or system which can be reprogrammed either through a local or remote interface. Such logic could implement a control system either in logic or via a set of commands executed by a processor.

Therefore, the scope of the invention is not intended to be limited to the various aspects and embodiments discussed and described herein. Rather, the scope and spirit of invention is embodied by the appended claims.

What is claimed is:

1. A cache intellectual property (IP) comprising:
   a plurality of service registers, wherein each service register stores maintenance operations information, which includes at least one of initialization and management of the cache IP, the plurality of service registers being distinct from cache lines of the cache IP and having a dedicated address range within the cache IP; and
   a service port for accessing the plurality of service registers,
   wherein the plurality of service registers are configured via a service port to identify an address range that is a sub-set of all addresses in the cache IP and the address range is defined as contiguous addresses between a start address and an end address, and
   wherein only cache lines whose address is within the address range are automatically invalidated using a trigger thereby ensuring any modified data at an address within the address range is no longer stored in the cache IP and main memory contains a latest copy of all modified data within the address range.

2. The cache IP of claim 1 further comprising a first port for communication upstream with a master issuing read and write transactions.

3. The cache IP of claim 2 further comprising a second port for communication downstream with a slave servicing the read and write transactions.

4. The cache IP of claim 3, wherein the slave is the main memory.

5. A method for automatically flushing some cache lines of a cache intellectual property (IP), the method comprising:
   selecting a plurality of service registers that are configured via a service port, wherein each service register stores maintenance operations information, which includes at least one of initialization and management of the cache IP, the plurality of service registers being distinct from cache lines of the cache IP and having a dedicated address range within the cache IP;
   identifying an address range that is associated with the plurality of service registers selected, wherein the address range is a sub-set of all addresses in the cache IP and the address range is defined as contiguous addresses;
   defining a control register, wherein the control register can trigger a flush operation of the cache lines in the address range; and
   signaling the control register to execute the flush operation of only cache lines in the address range associated with the plurality of service registers thereby ensuring dirty data stored at the address range is no longer in the cache IP and main memory contains a latest copy of the dirty data.

6. The method of claim 5, wherein flushed cache lines in the address range are written to the main memory.

7. The method of claim 5 further comprising configuring the plurality of registers through a service port.

8. A method comprising:
   defining a control register from a plurality of service registers, wherein the service registers are distinct from cache lines of a cache intellectual property (IP) and have a dedicated address range within the cache IP and are accessed for configuration via a service port and define an address range of cache lines of the cache IP, wherein the address range is a sub-set of all cache line addresses and the address range is defined as contiguous addresses between a start address and an end address;
   sending a trigger command to the control register;
   flushing only the plurality of cache lines within the address range; and
   flushing of maintenance operations information, which includes at least one of initialization and management of the cache IP, stored at each service register of the plurality of service registers,
   wherein flushing of only cache lines in the address range ensures dirty data stored at the address range is no longer in the cache IP and main memory has a most current version of the dirty data.

9. A cache intellectual property (IP) comprising:
   a plurality of service registers that are distinct from cache lines of the cache IP and have a dedicated address range within the cache IP, wherein each service register stores maintenance operations information; and
   a service port for accessing and configuring the plurality of service registers, wherein the plurality of service registers identify and define an address range that is a sub-set of all addresses of cache lines in the cache IP and the address range is defined as contiguous addresses between a start address and an end address, and wherein, upon a trigger, a flush operation automatically flushes cache lines within the address range, wherein cache lines with dirty data are written to main memory so that main memory includes a latest copy of all dirty data within the address range and the cache lines within the address range that includes dirty data are invalidated, and wherein cache lines in the address range having clean data are invalidated without writing the clean data to memory.

* * * * *